United States Patent
Langhe et al.

(10) Patent No.: US 12,427,754 B2
(45) Date of Patent: Sep. 30, 2025

(54) MULTICOMPONENT LAYERED DIELECTRIC FILM WITH SURFACE MODIFICATION

(71) Applicant: POLYMERPLUS LLC, Valley View, OH (US)

(72) Inventors: Deepak Langhe, Valley View, OH (US); Michael Ponting, Valley View, OH (US)

(73) Assignee: POLYMERPLUS, LLC, Valley View, OH (US)

( * ) Notice: Subject to any disclaimer, the term of this patent is extended or adjusted under 35 U.S.C. 154(b) by 545 days.

(21) Appl. No.: 17/261,515

(22) PCT Filed: Jul. 18, 2019

(86) PCT No.: PCT/US2019/042341
§ 371 (c)(1),
(2) Date: Jan. 19, 2021

(87) PCT Pub. No.: WO2020/018750
PCT Pub. Date: Jan. 23, 2020

(65) Prior Publication Data
US 2021/0291499 A1    Sep. 23, 2021

Related U.S. Application Data

(60) Provisional application No. 62/700,558, filed on Jul. 19, 2018.

(51) Int. Cl.
*B32B 27/08* (2006.01)
*B32B 27/20* (2006.01)
*H01G 4/14* (2006.01)

(52) U.S. Cl.
CPC ............ *B32B 27/08* (2013.01); *B32B 27/20* (2013.01); *H01G 4/14* (2013.01); *B32B 2250/42* (2013.01);
(Continued)

(58) Field of Classification Search
CPC ..... B32B 27/08; B32B 27/20; B32B 2250/42; B32B 2270/00; B32B 2307/204; B32B 2307/516; B32B 2457/16; H01G 4/14
See application file for complete search history.

(56) References Cited

U.S. PATENT DOCUMENTS 5,300,360 A    4/1994   Kocsis et al.
8,611,068 B2 * 12/2013  Baer ................. H01G 4/20
                                            361/313
(Continued)

FOREIGN PATENT DOCUMENTS

CN    106574061 A    4/2017
TW    201710063 A    3/2017
(Continued)

OTHER PUBLICATIONS

Applicant: PolymerPlus LLC; Chinese Patent Application No. 201980061011.1; Chinese Office Action dated Mar. 25, 2022; 5 pgs.
(Continued)

*Primary Examiner* — Michael P McFadden
(74) *Attorney, Agent, or Firm* — Tarolli, Sundheim, Covell &Tummino LLP

(57) ABSTRACT

A multicomponent dielectric film includes overlapping dielectric layers and outer layers that have a higher surface energy compared to the overlapping dielectric layers, the overlapping dielectric layers including at least a first polymer material, a second polymer material, and optionally a third polymer material, adjoining dielectric layers defining a generally planar interface therebetween which lies generally in an x-y plane of an x-y-z coordinate system, the interfaces between the layers delocalizing the charge build up in the layers.

12 Claims, 7 Drawing Sheets

(52) U.S. Cl.
CPC ..... *B32B 2270/00* (2013.01); *B32B 2307/204* (2013.01); *B32B 2307/516* (2013.01); *B32B 2457/16* (2013.01)

(56) References Cited

U.S. PATENT DOCUMENTS

| | | | |
|---|---|---|---|
| 2009/0034156 A1 | 2/2009 | Yamamoto | |
| 2014/0160623 A1* | 6/2014 | Baer | B32B 27/08 361/301.4 |
| 2017/0317466 A1* | 11/2017 | Huang | H01L 29/78 |
| 2019/0348220 A1* | 11/2019 | Ichikawa | H01G 4/18 |

FOREIGN PATENT DOCUMENTS

| | | | |
|---|---|---|---|
| WO | 2009/018267 A1 | 2/2009 | |
| WO | 2015/081487 A1 | 6/2015 | |
| WO | WO-2017048307 A1 * | 3/2017 | ............. B32B 27/08 |

OTHER PUBLICATIONS

Applicant: PolymerPlus LLC; Chinese Patent Application No. 201980061011.1; Chinese Search Report dated Mar. 18, 2022; 2 pgs.
Application No. 19837883.8, European Office Action dated Feb. 27, 2023.
Applicant: PolymerPlus LLC; Indian Patent Application No. 202147006507; Indian Examination Report dated Jul. 15, 2022; 6 pgs.
Applicant: Polymerplus LLC; "Multicomponent Layered Dielectric Film With Surface Modification"; PCT International Application No. PCT/US2019/042341, filed Jul. 18, 2019; PCT International Search Report and Written Opinion; Oct. 2, 2019; 7 pgs.
Brazilian Application No. BR1120210009620, Office Action dated Jun. 20, 2023.
Japanese Application No. 2021-526213, Office Action dated Jun. 6, 2023.
Korean Application No. 10-2021-7005094, Notice of Preliminary Rejection dated Aug. 13, 2024.
Indian Application No. 202147006507, Hearing Notice dated Jan. 23, 2025.
Brazilian Application No. BR112021000962-0, Office Action dated Jan. 21, 2025.

* cited by examiner

MULTICOMPONENT LAYERED DIELECTRIC FILM WITH SURFACE MODIFICATION

RELATED APPLICATION

This application claims priority from U.S. Provisional Application No. 62/700,558, filed Jul. 19, 2018, the subject matter of which is incorporated herein by reference in its entirety.

TECHNICAL FIELD

The present invention relates to multicomponent layered dielectric films and to their use in capacitors and other energy storing devices.

BACKGROUND

Capacitors employ thermoplastic dielectric thin film polymers, such as polypropylene (PP), polyethylene terephthalate (PET), polycarbonate, polyethylene-2,6-naphthalate, polyvinylidene difluoride (PVDF), polyphenylene oxide, polytetrafluoroethylene and polyphenylene sulfide, either metallized or maintained between metal foil electrodes. Metalized film capacitors are used extensively in a broad range of electrical and electronic equipment that include motor run and motor start circuits for air conditioners, fluorescent and high intensity light ballasts, power supplies, telecommunication equipment, instrumentation, and medical electronics. In many of these applications, the metallized capacitors are used to store energy.

U.S. Pat. No. 8,611,068 describes a multilayer coextrusion process of polymer materials for the production of dielectric films. The patent discloses dielectric multilayer polymer films comprising alternating layers of polymers with different dielectric properties creating interfaces between the layers that delocalizes the charge and improves the dielectric properties. The patent discloses using two or more polymers or blends thereof, miscible or immiscible, in multilayered films. Subsequent stretching of the films is also taught to improve the dielectric properties.

SUMMARY

Embodiments described herein relate to multicomponent layered dielectric films with film surface modifications that can enhance the surface energy of the films without significantly sacrificing dielectric performance of the films. Enhancement in surface energy of the films can enhance metal adhesion and electrode attachment to the outer surfaces of the film thereby improving metallization and electrode compatibility for capacitor and energy storage applications.

In some embodiments, the multicomponent layered dielectric film can include a plurality of discrete polymer layers that at least partially overlap to define discrete overlapping dielectric layers. The plurality of discrete polymer layers can include a first polymer layer, a second polymer layer, and, optionally, a third polymer layer that define one, two, three or more of the discrete overlapping dielectric layers.

The outer surface of the film (e.g., top surface and/or bottom surface) can be modified to enhance the surface energy of the film to improve metallization and electrode attachment to the film. In some embodiments, outer surface of the film can be modified with additional layers of same or different polymer(s) as outside layer(s). The outside layers can be added to provide improved surface energy properties to the film. In other embodiments, outer surface of the film can be modified with a surface treatment technique, such as corona treatment or UV photochemistry, to improve the surface energy of the film.

In some embodiments, the modified films can have a surface energy of at least about 30 dyne/cm$^2$, at least about 35 dyne/cm$^2$, at least about 40 dyne/cm$^2$, or at least about 45 dyne/cm$^2$ and a break down strength of at least about 700 MV/m, at least about 750 MV/m, about least about 800 MV/m, at least about 850 MV/m, at least about 900 MV/m, at least about 950 MV/m, or at least about 1000 MV/m.

In some embodiments, the multicomponent layered dielectric film can have a gradient layer structure or packets of layers with different individual layer thicknesses. The film can also contain multiple such packets with each packet of layers containing two or more layer thickness variations.

In other embodiments, the multicomponent layered dielectric film can include a stack of the discrete overlapping dielectric layers. The stack of dielectric layers can include at least a first polymer material, a second polymer material, and, optionally, a third polymer material. Adjoining dielectric layers of the stack can define a generally planar interface therebetween which lies generally in an x-y plane of an x-y-z coordinate system. The interfaces between the dielectric layers can delocalize charge build up in the layers to provide enhanced breakdown strength and reduced loss compared prior art dielectric films.

In some embodiments, at least one of the dielectric layers can include a stack of discrete polymer layers with polymer layer interfaces extending transverse to the x-y plane and optionally at least one non-polymeric filler having a higher dielectric constant than the first polymer material, the second polymer material, and/or the third polymer material.

In other embodiments, at least one of the dielectric layers can include about 1% to about 50% by volume of the non-polymeric filler or blend of two or more non-polymeric fillers or particle sizes. The non-polymeric filler can include at least one of particles, fibers, or other materials, such as $SrTiO_3$, $ZrO_2$, $HfO_2$, $Y_2O_3$, $CaCu_3Ti_4O_{12}$, $LaAlO_3$, $BaTiO_3$, $SiO_2$, $TiO_2$, $La_2O_3$, $Al_2O_3$, carbon black, graphene, or carbon nanotubes or their modifications.

In other embodiments, at least one of the dielectric layers can include a blend or mixture of two or more polymers. The two or more polymers can be substantially miscible with each other to allow extrusion of the polymer mixture or blend.

In some embodiments, the multicomponent dielectric film can include about 2 to about 500,000 alternating first dielectric layers and second dielectric layers fabricated by multilayer coextrusion forced assembly processes.

In some embodiments, a first dielectric layer formed from the first polymer material and the second polymer material can have a permittivity greater than a second dielectric layer formed from the third polymer material. In other embodiments, a second dielectric layer formed from the third polymer material can have a greater breakdown strength and a first dielectric layer formed from the first polymer material and the second polymer material.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
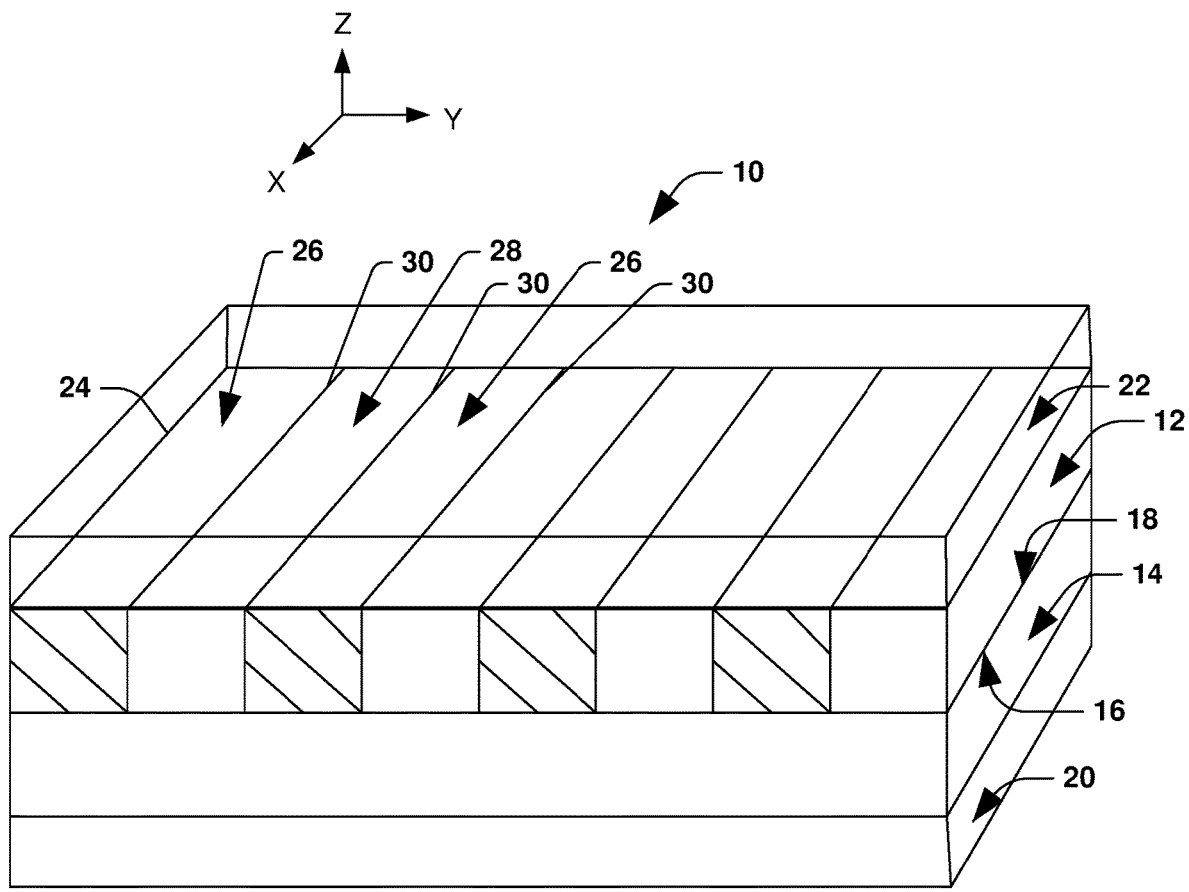
FIG. 1 is a schematic illustration of a multicomponent layered dielectric film in accordance with an embodiment.

Embodiments described herein relate to multicomponent layered dielectric films with film surface modifications that can enhance the surface energy of the films without significantly sacrificing dielectric performance of the film. Enhancement in surface energy of the films can enhance metal adhesion and electrode attachment to the outer surfaces of the films thereby improving metallization and electrode compatibility for capacitor and energy storage applications.

The multicomponent layered dielectric film includes a plurality of discrete polymer layers that at least partially overlap to define discrete overlapping dielectric layers. The plurality of discrete polymer layers can include a first polymer layer, a second polymer layer, and optionally a third polymer layer or additional polymer layers that define one, two, three or more of the discrete overlapping dielectric layers.

The outer surface of the film (e.g., top surface and/or bottom surface) can be modified to enhance the surface energy of the film to improve metallization and electrode attachment to the film. In some embodiments, outer surface of the film can be modified with additional layers of same or different polymer(s) as outside layer(s). The outside layers can be added to provide improved surface energy properties to the film. In other embodiments, outer surface of the film can be modified with a surface treatment technique, such as corona treatment or UV photochemistry, to improve the surface energy of the film.

In some embodiments, the modified films can have a surface energy of at least about 30 dyne/cm$^2$, at least about 35 dyne/cm$^2$, at least about 40 dyne/cm$^2$, or at least about 45 dyne/cm$^2$ and a break down strength of at least about 700 MV/m, at least about 750 MV/m, about least about 800 MV/m, at least about 850 MV/m, at least about 900 MV/m, at least about 950 MV/m, or at least about 1000 MV/m.

In some embodiments, the multicomponent layered dielectric film can include a stack of the discrete overlapping dielectric layers and outer layers with enhanced surface energy compared to the dielectric layers. The stack of dielectric layers can include at least a first polymer material, a second polymer material, and, optionally, a third polymer material. Adjoining dielectric layers of the stack can define a generally planar interface therebetween, which lies generally in an x-y plane of an x-y-z coordinate system. The interface between the dielectric layers can delocalize charge build up in the layers to provide enhanced breakdown strength and reduced loss compared prior art dielectric films.

In some embodiments, at least one of the dielectric layers can include a stack of discrete polymer layers with polymer layer interfaces extending transverse to the x-y plane and optionally at least one non-polymeric filler having a higher dielectric constant than the first polymer material, the second polymer material, and/or the third polymer material.

In other embodiments, the multicomponent layered dielectric film can have a gradient layer structure or packets of layers with different individual layer thicknesses. The film can also contain multiple such packets with each packet of layers containing two or more layer thickness variations. The layer structure can be present with additional layers of same or different polymer(s) as outside layer(s). The outside layers can be added to provide improved surface energy to enhance metal adhesion to the film.

Referring to FIG. 1, the surface modified multicomponent layered dielectric film 10 includes a first dielectric layer 12 of a first polymer material and second polymer material and a second dielectric layer 14 of a third polymer material, and outer layers 20 and 22 of a fourth polymer material. Adjoining surfaces 16 and 18 of the first dielectric layer 12 and second dielectric layer 14 define a generally planar interface therebetween which lies generally in an x-y plane of an x-y-z coordinate system. For example, the first dielectric layer 12 and second dielectric layer 14 can be stacked vertically such that adjoining surfaces of the first dielectric layer 12 and second dielectric layer 14 define a horizontal planar interface between the adjoining layers 12 and 14. The first dielectric layer 12 can include a stack of discrete polymer layers with polymer layer interfaces extending transverse to the x-y plane or horizontal to the vertical stack defined by first dielectric layer 12 and second dielectric layer 14.

In some embodiments, a stack of discrete polymer layers 24 can include alternating first polymer layers 26 and second polymer layers 28 of the first polymer material and second polymer material. The first polymer material of the first polymer layers 26 and the second polymer material of the second polymer layers 28 can have different compositions or be formed from different polymers. The third polymer of the second dielectric layer can have different compositions or be formed from different polymers than the first polymer and second polymer material.

In some embodiments, adjoining first polymer layers 26 and second polymer layers 28 of the stack can define a generally planar interface 30 therebetween. While the polymer layer interfaces 30 are illustrated as extending substantially perpendicular to the x-y plane, it will be appreciate that they can have other configurations.

The polymer materials used to form the first dielectric layer 12 and the second dielectric layer 14 can include polymers with desirable dielectric properties and with insulating properties that act as a barrier to electrical breakdown. In one example, the first polymer material and/or the second polymer material formed into the first dielectric layer 12 can be chosen to have a high permittivity (e.g., greater than the permittivity of the second polymer material) but it need not have a high dielectric strength. The third polymer material formed into the second dielectric layer can be chosen to have a high breakdown strength (e.g., greater than the breakdown strength of the first polymer material and/or second polymer material). The interfaces between the first dielectric layer(s) and second dielectric layer(s) can delocalize charge build up in the layers to provide enhanced breakdown strength and reduced loss compared prior art dielectric films.

The fourth polymer of the outer most layers 20 and 22 can be different than the first polymer material, the second polymer material, and third polymer material and be selected to improve or substantially improve the surface energy of the film compared to a film formed from alternating first polymer layers 26 and second polymer layers 28 of the first polymer material and second polymer material with outer most layers 32 and 34.

The fourth polymer material used to form outer or outer most layers of the multicomponent layered dielectric film can include any polymer material that can enhance or improve the surface energy of the film to improve metal adhesion to the dielectric film. The polymer material used to form the outer layers can have a higher surface energy than the first polymer materials used to form the first dielectric layers and the second dielectric layers.

Figure 2:
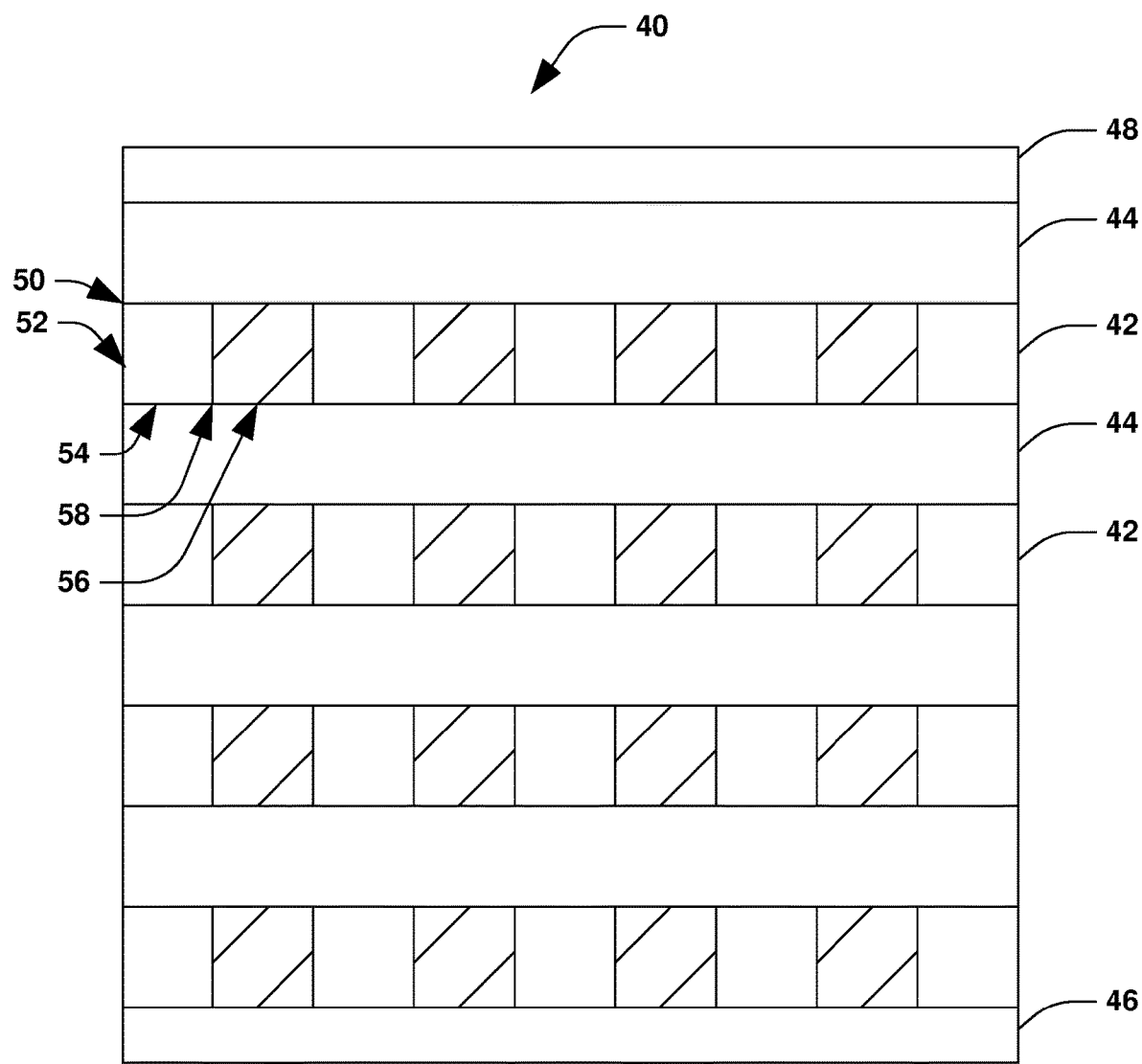
FIG. 2 is a schematic illustration of a multicomponent layered dielectric film in accordance with another embodiment.

FIG. 2 illustrates a multicomponent layered dielectric film 40 that includes a plurality of alternating first dielectric layers 42 and second dielectric layers 44 of the first polymer material, the second polymer material, and the third polymer material, and outer layers 46 and 48 of the fourth polymer material. The first dielectric layers 42 and the second dielectric layers 44 can be substantially parallel and vertically stacked so that each first dielectric layer 42 is adjacent to at least one of the second dielectric layers 44 and defines an interface 50 between each layer. The first dielectric layers 42 can include a horizontal stack 52 of first polymer layers 54 and second polymer layers 56 with interfaces 58 perpendicular or transverse to the interface 50 of the dielectric layers. The second dielectric layers 44 can be defined by third polymer layers 60. Each interface 50 of the dielectric layers 42 and 44 and/or the combination of interfaces 50 of the dielectric layers 42 and 44 can delocalize charge build up in the layers 42 and 44 and the multicomponent film 40 allowing increased charge storage on electrodes when used in capacitor applications.

The outer layers 46 and 48 of the fourth polymer material can include any polymer material that can enhance or improve the surface energy of the film to improve metal adhesion to the dielectric film. The polymer material used to form the outer layers 46 and 48 can have a higher surface energy than the polymer materials used to form the first dielectric layers and the second dielectric layers.

Figure 7:
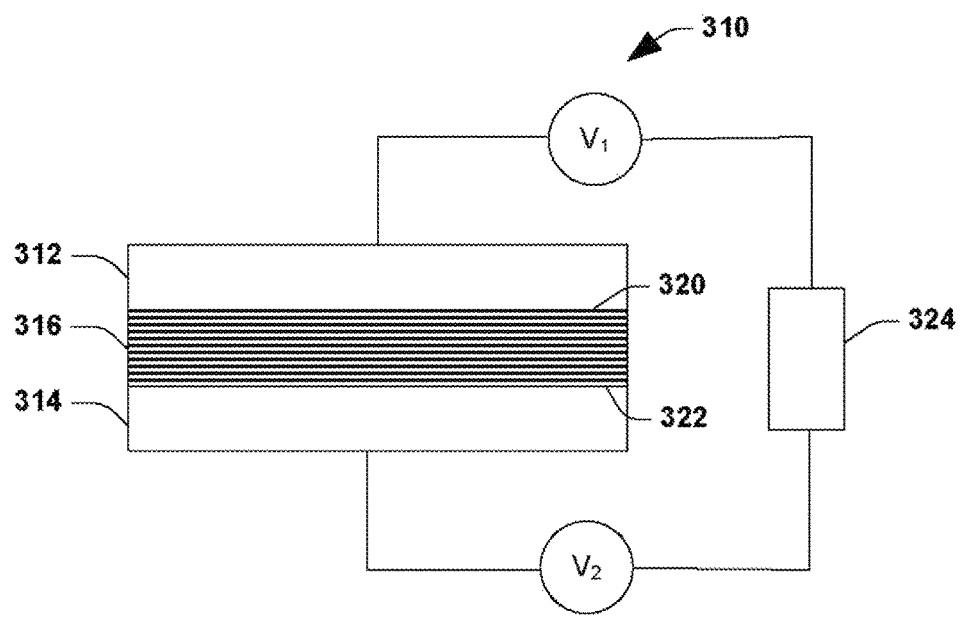
FIG. 7 is a schematic illustration of a capacitor in accordance with an embodiment.

The first dielectric layers 42, the second dielectric layers 44, and outer layers 46 and 48, as well as the first polymer layers 54, the second polymer layers 56, and third polymer layers 60 can have various thicknesses, for example, about 5 to about 5000 nm that can be readily varied to adjust electric properties of the multicomponent layered dielectric film. When employed as a film 316 in a capacitor as shown in FIG. 7, the first dielectric layer(s), second dielectric layer(s), and outer layer(s) are perpendicular to the electrical field thus maximizing the breakdown field or strength of the film 316 by maximizing the barrier to electrical breakdown propagation presented by the polymer materials. Since the maximum stored energy density of dielectric materials is proportional to the effective permittivity times the square of the dielectric strength, the maximum stored energy density of the multicomponent layered dielectric film can substantially exceed that of either of the component polymers in their pure state. The outer layers can have an improved or higher surface energy compared to the first dielectric layers and second dielectric layers to enhance metallization efficiency and efficacy of metal electrode attachment of the capacitor without adversely affecting the dielectric performance of the polymer layers.

Figure 3:
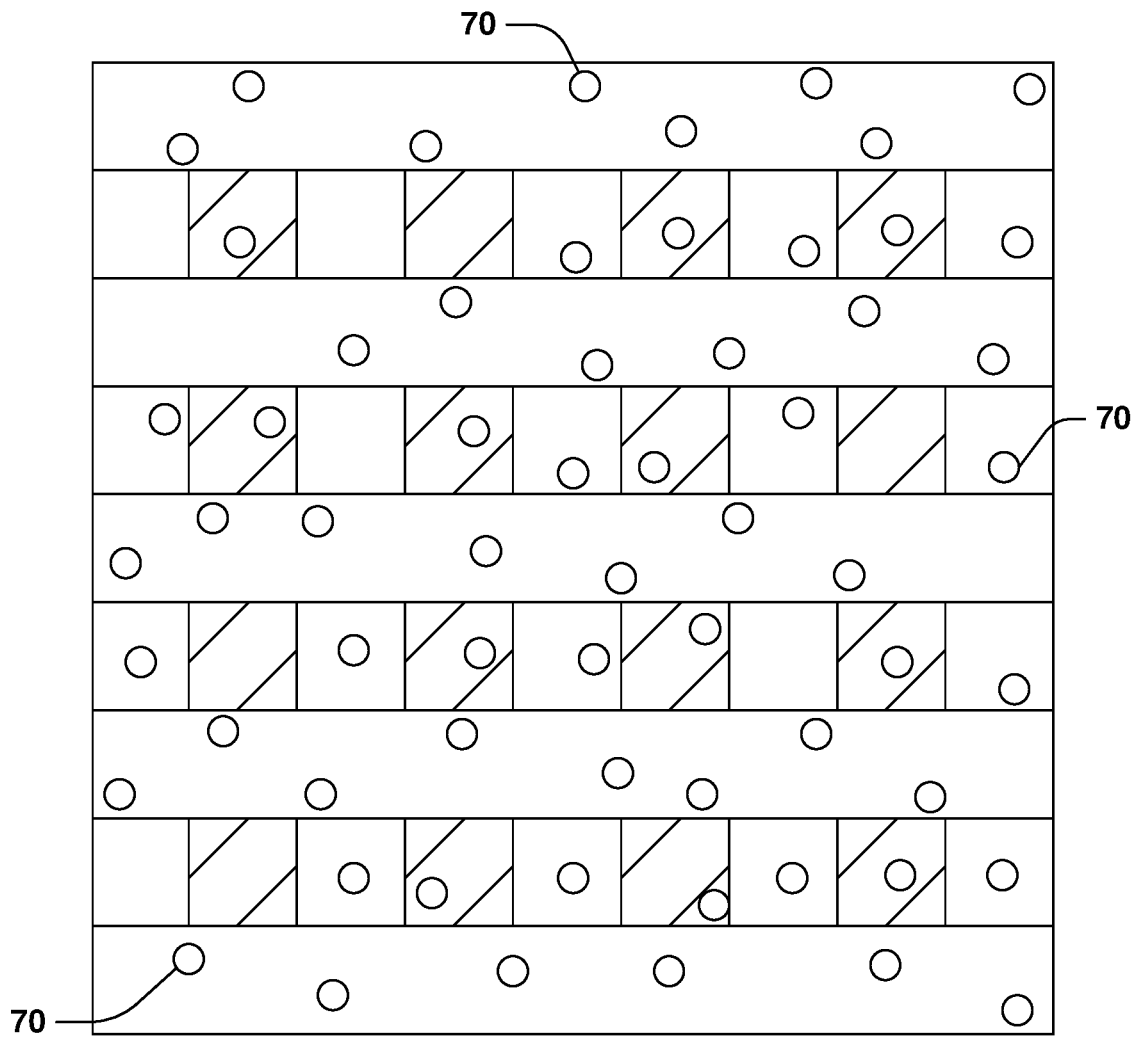
FIG. 3 is a schematic illustration of a multicomponent layered dielectric film in accordance with another embodiment.

Optionally, as shown in FIG. 3, the first dielectric layer, the second dielectric layer, and/or outer layers can include one of more additives 70 to improve the stored energy density, break down, and/or permittivity of the multilayer polymer dielectric film. For example, the first dielectric layer and/or the second dielectric layer can include about 1% to about 50% by volume of a non-polymeric filler or blend of two or more non-polymeric fillers or particle sizes to improve dielectric properties (i.e., discharge resistance, breakdown strength, and permittivity) of the host polymer. The non-polymeric filler can include particle, fibers, or other fillers such as metal oxide particles, including $SrTiO_3$, $ZrO_2$, $HfO_2$, $Y_2O_3$, $CaCu_3Ti_4O_{12}$, $LaAlO_3$, $BaTiO_3$, $SiO_2$, $TiO_2$, $La_2O_3$, $Al_2O_3$, carbon black, graphene, and/or carbon nanotubes and their modifications.

The first polymer material, the second polymer material, and, optionally, the third polymer material can be selected so that the stored energy density and break down strength of the film is maximized. In an aspect of the invention, the first polymer material and/or second polymer material used to form the first dielectric layers can comprise a thermoplastic polymer, such as glassy, crystalline or elastomeric material, that has a high permittivity (e.g., permittivity greater than the third polymer material). The first polymer material and/or second polymer material can comprise a single polymer, a composite polymer material, or a blend of polymers. In an aspect of the invention, the stored energy density and the permittivity can be substantially greater than the stored energy density and permittivity of the third polymer material.

In another aspect, the third polymer material can comprise a thermoplastic, such as glassy, crystalline or elastomeric material, that has a high breakdown strength (e.g., breakdown strength higher than the first polymer material and/or the second polymer material). The third polymer material can comprise a single polymer, a composite polymer material, or a blend of polymers. In one aspect of the invention, the breakdown strength of the third polymer material can be substantially greater than the breakdown strength of the first polymer material and/or second polymer material and this can give the multicomponent film a higher maximum stored energy density and breakdown strength than either of the pure component polymers.

In a further embodiment, the fourth polymer material used to form outer or outer most layers of the multicomponent layered dielectric film can include any polymer material that can enhance or improve the surface energy of the film to improve metal adhesion to the dielectric film. The polymer material used to form the outer layers can have a higher surface energy than the first polymer materials used to form the first dielectric layers and the second dielectric layers.

In another aspect, the layer structure can constitute thickness variation along the Z-direction of the layer stack. The film can constitute a gradient layer structure or packets of layers with different individual layer thicknesses. The film can also contain multiple such packets with each packet of layers containing two or more layer thickness variations.

In other embodiments, the multicomponent film structure can be treated with other techniques, such as corona treatment, UV cross-linking, curing or imbibing with other molecules to further improve the surface energy of the film.

One of ordinary skill in the art will readily appreciate that a wide variety of thermoplastic polymeric materials can be used to form the first dielectric layers, second dielectric layers, and outer layers of the multicomponent layered dielectric film described herein. Such materials include, but are not limited to glassy polymers, crystalline polymers, and elastomers.

The term "polymer" or "polymeric material" as used in the present application denotes a material having a weight average molecular weight (Mw) of at least 5,000. Preferably, the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Examples of polymeric materials that can be used to form the first dielectric layers, second dielectric layers, and outer layers of the multicomponent layered dielectric film include maleic anhydride-modified polypropylene (PPgMA); polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, $\alpha$-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl) pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. The dielectric layers can also be formed from copolymers such as, styrene-acrylonitrile copolymer (SAN), for example, containing between 10 and 50 wt %, preferably between 20 and 40 wt %, acrylonitrile, styrene-ethylene copolymer; and poly(ethylene-1,4-cyclohexylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers, PLA, COCs, ETFE, and PFA.

In addition, each individual layer can include blends of two or more of the above-described polymers or copolymers. The components of the blend can be substantially miscible or immiscible.

In one example, the first dielectric layer(s) can be formed from a stack of first polymer layers and second polymer layers that have a high permittivity, such as polyvinylidene fluoride (PVDF) or a copolymer thereof, such as poly(vinylidene fluoride-co-hexafluoropropylene) (P(VDF-HFP)) and poly(methyl methacrylate) (PMMA) or composites thereof. The second dielectric layers can be formed from third polymer layers of polypropylene (PP), polyethylene teraphthalate (PET), polycarbonate (PC), poly(p-phenylene sulfide), copolymers thereof, or composites thereof. The outer layers can be formed of, for example, polypropylene, polyethylene, or polyoxymethylene The weight ratio or weight percent of the first polymer material to the second polymer material, the third polymer material, and/or fourth polymer material in the multicomponent layered dielectric film can be adjusted by altering the thicknesses of the first dielectric layer, the second dielectric layer, and/or outer layers to tailor the dielectric and energy density properties of the film. Additionally, the weight ratio or weight percent of the polymers used to form the first polymer layers, the second polymer layers, the third polymer layers, and/or outer layers can be adjusted by altering the thicknesses of the first polymer layers, second polymer layers, third polymer layers, and/or outer layers to tailor the dielectric, energy density, and surface energy properties of the film.

It will be understood, however, that a specific constituent or concentration of the first polymer material, the second polymer material, third polymer material, and/or fourth polymer material or any constituent in a multicomponent layered dielectric film described herein can be adjusted so as to tailor the properties of polymeric dielectrics for different applications. For an implantable defibrillator, for example, high energy density is required as well as high breakdown voltages. In that instance, as shown in the example described herein it is necessary to maximize the PVDF and PMMA content for the energy requirement and to balance it accordingly with PC to stabilize the poor electrical properties of PVDF and PMMA. However, to obtain some desired property (ies) other than simply energy density, it may be necessary to reduce the concentration of PVDF and PMMA.

The multicomponent layered dielectric film includes at least two discrete dielectric layers (i.e., the first dielectric layer and the second dielectric layer), for example, at least 10 dielectric layers alternating between the first dielectric layer and the second dielectric layer and optionally two outer layers to enhance the surface energy of the multicomponent layered dielectric film. The number of layers in the multicomponent layered dielectric film is preferably in the range of from about 2 to about 100,000 and more preferably from about 10 to about 10,000, including any increments within these ranges. The multicomponent layered dielectric film can include up to about 500,000 layers alternating between the first layer and the second layer.

The vertical dielectric layers and outer layers of the multicomponent layered dielectric film can have thicknesses in the range of, for example, about 5 nanometers (nm) to about 1,000 micrometers ($\mu$m). The thicknesses of the first dielectric layer(s) and the second dielectric layer(s) are such that the final a multicomponent layered dielectric film can have a hierarchical structure or gradient structure on the nanometer, the micrometer and the centimeter scale. The number of first dielectric layers and second dielectric layers employed in the multicomponent layered dielectric film as well as the thicknesses of each of the layer can be selected so that the energy density and breakdown strength of the film is maximized. The thicknesses of the outer layers can also be selected to enhance the surface energy of the dielectric film without sacrificing dielectric performance.

In some embodiments, the horizontal polymer layers of the dielectric layers can have thicknesses in the range of, for example, about 5 nanometers (nm) to about 500 micrometers ($\mu$m). The thicknesses of the first polymer layer(s) and the second polymer layer(s) are such that the final a multicomponent layered dielectric film can have a hierarchical structure on the nanometer, the micrometer and the centimeter scale. The number of horizontal polymer layers in each dielectric layer as well as the thicknesses of each of the polymer layer can be selected so that the energy density and breakdown strength of the film is maximized.

The multilayer dielectric film can also include other polymer layers besides the first dielectric layer(s) and the second dielectric layer(s). These other dielectric layers can be interspersed with the first dielectric layers and the second dielectric layers to modify the stored energy density, breakdown, and permittivity. In one example, the first layer (A), the second layer (B), and the addition (i.e., third) layer can be alternated so that the multicomponent layered dielectric film has a three component structure of alternating layers (ABCABCABC . . . ) or (ABC) x, where x is at least 5. It will be appreciated that the first layer, second layer, and third layer can be provided any number of different component layers such as (CACBCACBC . . . ).

Figure 4:
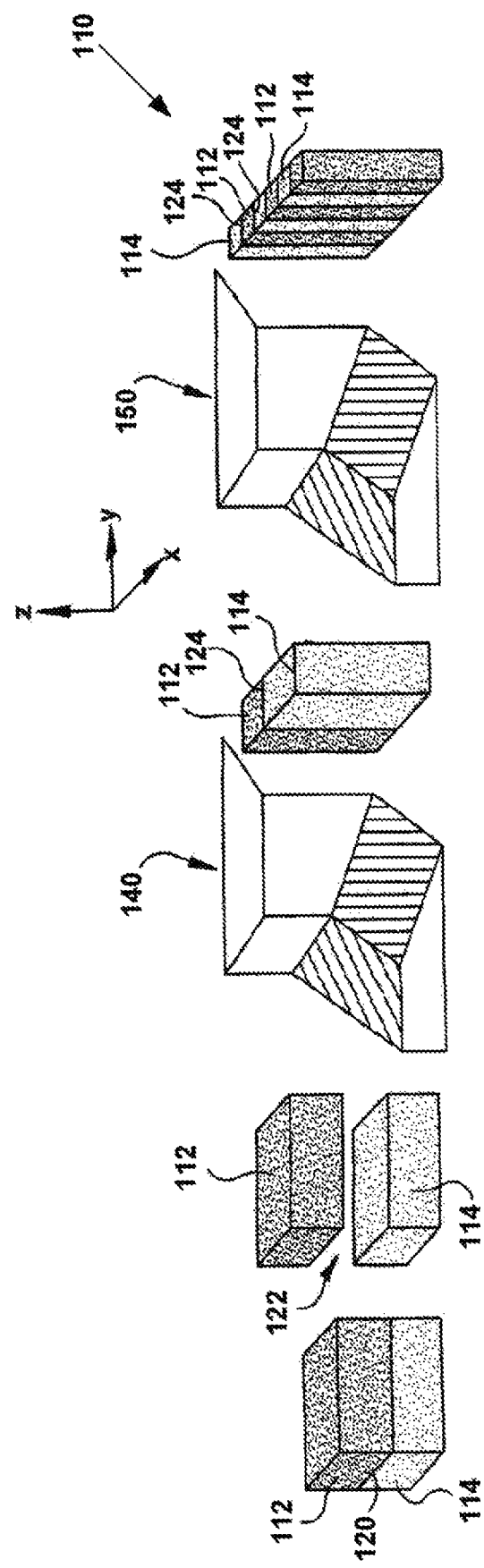
FIG. 4 is a schematic illustration of a co-extrusion and layer multiplying process used to form a multicomponent layered dielectric film in accordance with an embodiment.
Figure 5:
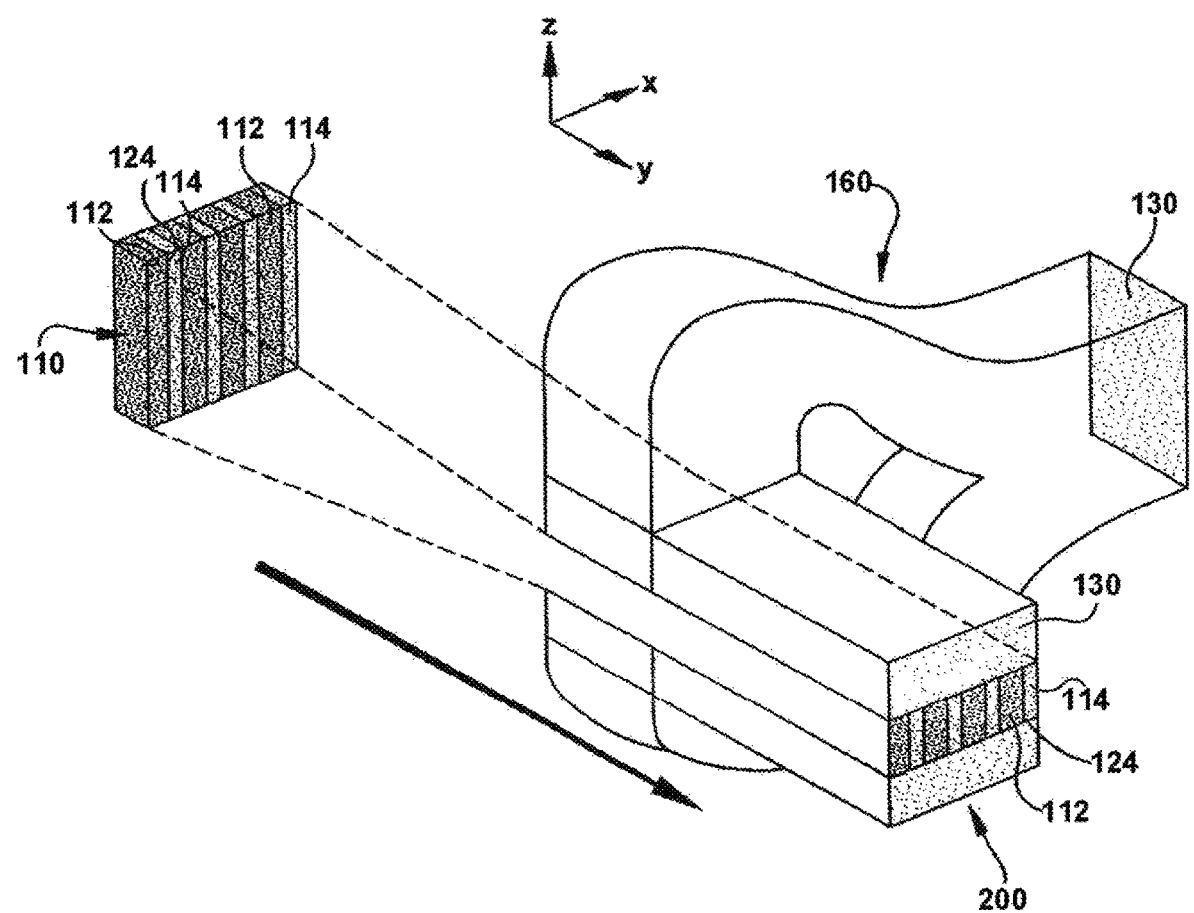
FIG. 5 is a schematic illustration of coextruding skin layers onto the composite film of FIG. 8 to form a composite stream.
Figure 6:
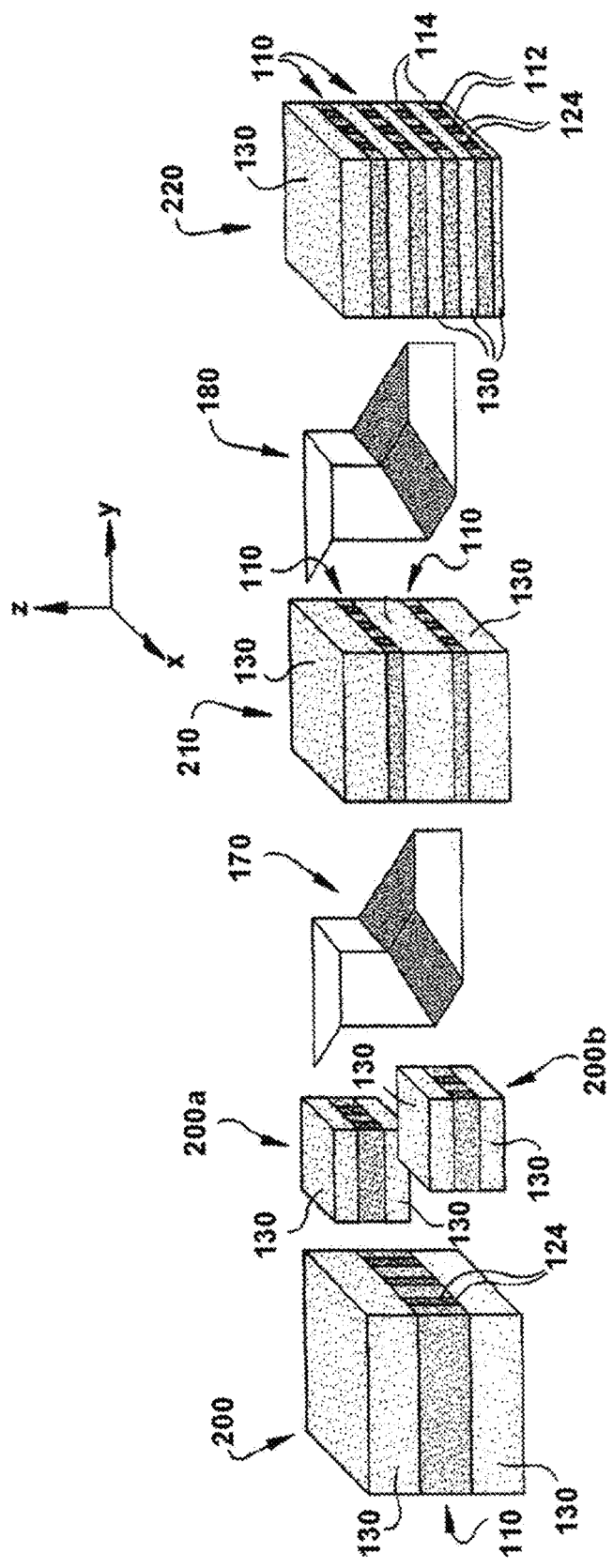
FIG. 6 is a schematic illustration of additional layer multiplying steps for the composite stream of FIG. 5.

In some embodiments as illustrated in FIG. 4-6, the multicomponent dielectric film can be prepared by coextruding the first polymer material, the second polymer material, and the third polymer material to form overlapping first polymer layers, second polymer layer, and third polymer layers. The first polymer material, the second polymer material, and the third polymer material can be substantially immiscible during co-extrusion to define discrete or separate layers.

The overlapping layers can be multiplied to form first dielectric layers of horizontal stacks of the first polymer layers and second polymer layers interspersed between second dielectric layers of the third polymer material. In some embodiments, multiplying the overlapping layers comprises vertical layer multiplication of the overlapping first polymer layer and second polymer layer by cutting the flow horizontally of the overlapping layers through a die, surface layering the overlapping polymers layers on a top and bottom surface of vertical layers formed by the vertical layer multiplication, and horizontal layer multiplication of the surface layered vertical layers to stack one side portion of the surface layered vertical stack on a second side portion. In some embodiments, the vertical layer multiplication is repeated eight times to yield vertical layers composed of 1024 alternating 512 layers of the first layer and 512 layers of second layer.

FIG. 4 illustrates a co-extrusion and multiplying process used to form a multicomponent layer dielectric film 110. First, a first polymer layer 112 and a second polymer layer 114 are provided. The first layer 112 is formed from a first polymer material (a) and the second polymer layer 14 is formed from a second polymer material (b). The second polymer material (b) can be substantially immiscible and have a similar viscosity with the first material (a) when co-extruded. It will be appreciated that one or more additional layers formed from the polymer materials (a) or (b) or a different polymer materials may be provided to produce the multicomponent layered dielectric film 110.

Referring to FIG. 4, the layers 112, 114 are co-extruded and multiplied in order to form the multilayered polymer composite film 110. In particular, a pair of dies 140, 150 is used to co-extrude and multiply the layers 112, 114. Each layer 112, 114 initially extends in the y-direction of an x-y-z coordinate system. The y-direction defines the length of the layers 12, 14 and extends in the general direction of flow of material through the dies 140, 150. The x-direction extends transverse, e.g., perpendicular, to the y-direction and defines the width of the layers 112, 114. The z-direction extends transverse, e.g., perpendicular, to both the x-direction and the y-direction and defines the height or thickness of the layers 112, 114.

The layers 112, 114 are initially stacked in the z-direction and define an interface 120 therebetween that resides in the x-y plane. As the layers 112, 114 approach the first die 140 they are separated from one another along the z-axis to define a space 122 therebetween. The layers 112, 114 are then re-oriented as they pass through the first die 140. More specifically, the first die 140 varies the aspect ratio of each layer 112, 114 such that the layers 112, 114 extend longitudinally in the z-direction. The layers 112, 114 are also brought closer to one another until they engage or abut one another along an interface 124 that resides in the y-z plane.

The layers 112, 114 then enter the second die 150 where layer multiplication occurs. The second die 150 may constitute a single die or several dies which process the layers 112, 114 in succession (not shown). Each layer 112, 114 is multiplied in the second die 150 to produce a plurality of first layers 112 and a plurality of second layers 114 that alternate with one another to form the multilayered polymer composite film 10. Each pair of layers 112, 14 includes the interface 124 that resides in the y-z plane. The layers 112, 114 are connected to one another generally along the x-axis to form a series of discrete, alternating layers 112, 114 of polymer material (a), (b). Although three of each layer 112 and 114 are illustrated, it will be appreciated that the multilayered polymer composite film 110 may include, for example, up to thousands of each layer 112, 114.

Referring to FIG. 5, once the multilayered polymer composite film 110 is formed an outer layer 10 is applied to the top and bottom of the film 110 such that the film 110 enters a die 160 where the film 110 is sandwiched between two outer layers 130 along the z-axis to form a first composite stream 200. The outer layer 130 may be formed from the polymer material (a), the polymer material (b) or a polymer material (c) different from the polymer material (a) and material (b).

Referring to FIG. 6, the first composite stream 200 is divided along the x-axis into a plurality of branch streams 200a, 200b and processed through a pair of multiplying dies 170, 180. In the die 170, the streams 200a, 200b are stacked in the z-direction, stretched in both the x-direction and the y-direction, and recombined to form a second composite stream 210 that includes a plurality of dielectric alternating polymer layers 210 alternating with outer dielectric layers 130. Biaxial stretching of the branch streams 200a, 200b in the x-direction and y-direction may be symmetric or asymmetric.

The die 180 performs similar modifications to the second composite stream 210 that the die 170 performed on the branch streams 200a, 200b. In particular, in the die 180 the second composite stream 210 is divided along the x-axis, stacked along the z-axis, stretched in both the x-direction and the y-direction, and stacked in the z-direction to form a third composite stream 220. The third composite stream 220 shown in FIG. 3 includes four multilayered dielectric films 10 that alternate with five outer dielectric layers 130, although more or fewer of the films 110 and/or layers 130 may be present in the third composite stream 220. Regardless, the third composite stream 220 includes a plurality of layer interfaces 124 between the layers 112, 114. By changing the volumetric flow rate of the polymer layers 112, 114 through the dies 170, 180, the thickness of both the polymer layers 112, 114 and each multilayered dielectric film 110 in the z-direction can be precisely controlled.

In some embodiments, once the multicomponent layer dielectric film is formed, outer surface layers having enhanced surface energy can be applied to the top and bottom surface of the stacked films. The outer surface layers can be laminated to the top or bottom surface of the stacked film or added in-line during the coextrusion process. The outer layers may be formed from the polymer material (a), the polymer material (b) or a polymer material (c) different from the polymer material (a) and material (b) that has a higher surface energy than polymer (a) and/or polymer (b) to enhance metallization of the multicomponent layer dielectric film.

In other embodiments, once the multicomponent layer dielectric film is formed, outer surfaces of the multicomponent layer dielectric film can be modified by processes, such as carona treatment, to enhance surface energy of the multicomponent dielectric film.

In some embodiments, the first surface layer and opposite second surface layer of the multicomponent layered dielectric film so formed can be metalized with a first layer and a second layer of an appropriate metal, such as aluminum, to form a first electrode and a second electrode. The first metal layer and second metal layer can have thicknesses of about 5 nm to about 500 nm and be formed, for example, by conventional metallization techniques.

In another embodiment, the dielectric properties of the multicomponent layered dielectric film can be varied mechanically by axially orienting (e.g., stretching), pressure, tension, compression or shear stresses or a combination of these stresses. As pointed out above, the composite can be fabricated so that one or both of the component polymers is an elastomer. Axial orientation of the multicomponent layered dielectric film in at least one direction parallel to the surface of the film can in some instances increase or improve the breakdown strength of the film. In one example, the multicomponent layered dielectric film can be biaxially oriented by stretching the film in a plane that is substantially parallel to a surface of the film at a draw ratio effective to increase the breakdown strength of the film. The draw ratio of the biaxially oriented multilayer polymer dielectric film can be about 1:1 to about 5:5. It will be appreciated that although the film can be biaxially oriented by stretching the film in at least two directions, the film can also be stretched in a single direction (e.g., uniaxially oriented) or stretched in multiple directions (e.g., triaxially oriented).

A number of designs of the multicomponent layered dielectric film are possible by choosing the appropriate initial materials and tailoring the polymer material, number of layers of the polymer materials, and thicknesses of the layers.

Very thin metalized film capacitors can be designed with this multilayer technique to enable achieving a device with stable dielectric constant and, hence, stable capacitance with voltage, improved insulation resistance and clearing or self-healing ability, lower leakage currents, and higher voltage breakdowns (compared, for example, with homopolymer PVDF), with the potential for unprecedented energy density from a bulk capacitor system. The markedly higher performance values (energy density, reliability, weight) is anticipated to be matched by markedly lower cost per unit of performance when volume manufacturing is employed. The methodology of the invention is well suited for the production of the implantable defibrillator, for example, and in many other high pulse power applications where energy density is afforded a premium.

The surface modified multicomponent layered dielectric film offers high dielectric constant, improved stability, improved dissipation factor, improved clearing ability, improved metallization, high breakdown voltage, which allows it to be well suited for capacitor applications. For example, FIG. 7 illustrates a schematic view of a capacitor 310 in accordance with an embodiment of the application. The capacitor 310 includes a first electrode 312, a second electrode 314, and a multicomponent layered dielectric film 316. The multicomponent layered dielectric film 316 includes a first surface 320 and second surface 322 that is separated from and substantially parallel to the first surface 320. The multicomponent layered dielectric film is sandwiched between the first electrode 312 and the second electrode 314 such that the first electrode 312 is provided on and in contact with the first surface 320 and the second electrode 14 is provided on and in contact with the second surface 322. The first electrode 312 can be coupled to first power source, and the second electrode 14 can be coupled to a second power source 302. The first source $V_1$ and the second power source $V_2$ can be coupled to a voltage source 324 that is capable of applying varying bias voltages to the electrodes 312 and 314.

Although this film is particularly well suited for film capacitor applications, it is also useful in electrical cables, magnetic tapes, optical films for security and other purposes, piezoelectric sensors, and food packaging, to name a few other applications.

This invention is further illustrated by the following example, which should not be construed as limiting. The contents of all references, patent applications, patents, and published patent applications cited throughout this application are hereby incorporated by reference.

Example

Figure 8:
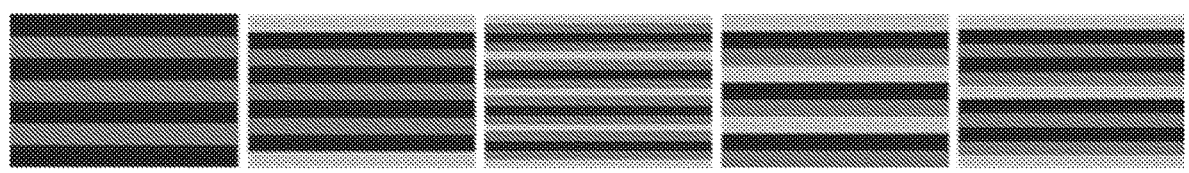
FIG. 8 is a schematic drawing comparing multicomponent layered dielectric films with different layer structures to achieve different outermost layers and structures.

In this Example, multicomponent multilayered films were fabricated using coextrusion technology to create various film structures as shown in FIG. 8. The multicomponent structure can constitute a layered structure of polymers A and B with different dielectric properties. In a typical multilayer film structure, either A or B or both polymers are present as the outermost layers in the film. The overall surface properties including surface energy are strongly influenced by the outer layers. In the demonstrated innovation, a third polymer with a desired surface energy can be added to a film structure as shown in FIG. 8 such that the outermost layers constitute this new polymer. Presence of a new polymer affects the surface energy of the films, without significantly sacrificing dielectric performance.

TABLE 1

Dielectric Properties of Different System

| Film System | Composition (PVDF/PC/Polymer C) | Dielectric constant (10 Hz) | Breakdown Strength (MV/m) | Surface Energy (dyne/cm²) |
|---|---|---|---|---|
| [PC/PVDF/PC]$_n$ | 50/50 | 4.8 | 900 ± 100 | 30 |
| PP[PC/PVDF]$_n$PP | 33.3/33.3/33.3 | 3.9 | 890 ± 140 | >40 |
| [PP/PVDF/PC/PVDF/PP]$_n$ | 33.3/33.3/33.3 | 3.9 | 840 ± 160 | >40 |

TABLE 1-continued

Dielectric Properties of Different System

| Film System | Composition (PVDF/PC/ Polymer C) | Dielectric constant (10 Hz) | Breakdown Strength (MV/m) | Surface Energy (dyne/cm$^2$) |
|---|---|---|---|---|
| PE[PVDF/PET]$_n$PE[PVDF/ PET]$_n$PE | 30/30/40 | 5.1 (PVDF/PET core) | 880 ± 90 | — |
| [POM/PVDF/POM/PC/POM]$_n$ | 40/40/20 | 5.2 | 840 ± 70 | 43 |

Referring to Table 1, the films with different geometric structures were fabricated to evaluate the dielectric properties. Polycarbonate (PC) and Polyvinylidene fluoride (PVDF) films with a third polymer such as polypropylene (PP), polyethylene, polyoxymethylene were fabricated. Examples of films with PP as component of the layered structure did not affect the overall dielectric performance of the films, while improving the surface energy properties of the film. The overall breakdown strength of the films did not change significantly as compared to PC/PVDF film systems, however, it was still significantly better than PVDF control film. The dielectric constant of the films varied as a function of the composition. By varying the ratio of the component polymers, the dielectric constant of the systems can be varied further. This third polymer can be added in-line during coextrusion process or post-production by several techniques such as lamination, polymer deposition or solvent casting. The surface energy can also be modified by other surface treatment techniques such corona treatment or UV photochemistry.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. The multilayer polymer dielectric film is primarily intended to be used in film capacitors for devices, such as defibrillators, vehicle power systems, pulsed power application, drilling systems, etc, but it could be used anywhere where higher operating temperatures, higher efficiency, faster charge time, and larger number of charge-discharge cycles are desired compared to conventional film capacitors and batteries.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, the following is claimed:

1. A multicomponent dielectric film comprising a stack of overlapping dielectric layers and outer layers forming the outermost layers of the multicomponent dielectric film that have a higher surface energy compared to the overlapping dielectric layers, the stack of overlapping dielectric layers including first dielectric layers and second dielectric layers of at least a first polymer material, a second polymer material, and optionally a third polymer material, adjoining first and second dielectric layers defining a generally planar interface therebetween which lies generally in an x-y plane of an x-y-z coordinate system, the interfaces between the layers delocalizing the charge build up in the layers allowing increased charge storage on electrodes, wherein the outer layers are formed from a fourth polymer material having a different composition and a higher surface energy than the first polymer material, the second polymer material, and optional third polymer material forming the stack of overlapping dielectric layers, and the fourth polymer material is selected from polypropylene, polyethylene, or polyoxymethylene, and wherein the multicomponent dielectric film has a surface energy of at least 40 dynes/cm$^2$.

2. The multicomponent dielectric film of claim 1, wherein the at least one of the dielectric layers includes a blend of two or more polymers.

3. The multicomponent dielectric film of claim 1, the first dielectric layers including a stack of discrete polymer layers with polymer layer interfaces extending transverse to the x-y plane and optionally at least one non-polymeric filler having a higher dielectric constant than the first polymer material, the second polymer material, and/or third polymer material.

4. The multicomponent dielectric film of claim 3, wherein the stack of discrete polymer layers includes alternating first polymer layers and second polymer layers, adjoining first polymer layers and second polymer layers of the stack defining a generally planar interface therebetween.

5. The multicomponent dielectric film of claim 4, wherein the polymer layer interfaces extend substantially perpendicular to the x-y plane.

6. The multicomponent dielectric film of claim 5, the first polymer material and/or second polymer material having a permittivity greater than the third polymer material, and the third polymer material having a breakdown strength greater than the first polymer material and/or the second polymer material.

7. The multicomponent dielectric film of claim 1, comprising about 2 to about 500,000 alternating first dielectric layers and second dielectric layers.

8. The multicomponent dielectric film of claim 1, comprising a stack of alternating first dielectric layers and second dielectric layers fabricated by multilayer coextrusion forced assembly processes.

9. The multicomponent dielectric film of claim 1 being axially oriented in at least one direction substantially parallel to a surface of the film at a ratio effective to increase the breakdown strength of the film.

10. An energy storage device comprising a multicomponent dielectric film, the film including a stack of discrete overlapping dielectric layers and outer layers forming the outermost layers of the multicomponent dielectric film that have a higher surface energy compared to the overlapping dielectric layers, the stack of overlapping dielectric layers including first dielectric layers and second dielectric layers of at least a first polymer material, a second polymer material, and optionally a third polymer material, adjoining dielectric layers defining a generally planar interface therebetween which lies generally in an x-y plane of an x-y-z coordinate system, the interfaces between the layers delocalizing the charge build up in the layers allowing increased charge storage on electrodes of the device, wherein the outer layers are formed from a fourth polymer material having a different composition and a higher surface energy than the first polymer material, the second polymer material, and optional third polymer material forming the stack of overlapping dielectric layers, and the fourth polymer material is selected from polypropylene, polyethylene, or polyoxymethylene, and wherein the multicomponent dielectric film has a surface energy of at least 40 dynes/cm$^2$.

11. The energy storage device of claim 10, comprising a capacitor.

12. The energy storage device of claim 11, comprising a wound or stacked capacitor.

\* \* \* \* \*